US00RE35744E

United States Patent [19]

Foster et al.

[11] E Patent Number: Re. 35,744

[45] Reissued Date of Patent: Mar. 17, 1998

[54] SPINNER ASSEMBLY FOR A SPRAYER

[75] Inventors: Donald D. Foster, St. Charles; Philip L. Nelson, Ellisville, both of Mo.

[73] Assignee: Contico International, Inc., St. Louis, Mo.

[21] Appl. No.: 513,099

[22] Filed: Aug. 9, 1995

Related U.S. Patent Documents

Reissue of:

[64] Patent No.: 5,234,166
Issued: Aug. 10, 1993
Appl. No.: 603,281
Filed: Oct. 25, 1990

[51] Int. Cl.[6] ..... B05B 1/12

[52] U.S. Cl. ..... 239/333; 239/481; 239/485; 239/493; 222/383

[58] Field of Search ..... 239/333, 337, 239/476, 479–481, 483, 485, 468, 491–497; 222/380, 383

[56] References Cited

U.S. PATENT DOCUMENTS

| | | |
|---|---|---|
| 1,461,545 | 7/1923 | Purnell . |
| 4,350,298 | 9/1982 | Tada . |
| 4,358,057 | 11/1982 | Burke . |
| 4,463,905 | 8/1984 | Stoesser et al. . |
| 4,489,861 | 12/1984 | Saito et al. . |
| 4,640,444 | 2/1987 | Bundschuh . |
| 4,678,123 | 7/1987 | Klaeger . |
| 4,706,888 | 11/1987 | Dobbs . |
| 4,815,663 | 3/1989 | Tada . |
| 4,940,186 | 7/1990 | Tada . |
| 4,989,790 | 2/1991 | Martin et al. . |

FOREIGN PATENT DOCUMENTS

| | | |
|---|---|---|
| 0 117 898 | 9/1984 | European Pat. Off. . |
| 0322488A1 | 12/1987 | European Pat. Off. . |
| 331020A1 | 4/1983 | Germany . |
| 60-183056 | 9/1985 | Japan . |
| 60-44023 | 10/1985 | Japan . |

*Primary Examiner*—Kevin Weldon
*Attorney, Agent, or Firm*—Howell & Haferamp, L.C.

[57] ABSTRACT

A cap, spinner, and discharge nozzle assembly for use with a liquid dispensing apparatus such as a trigger sprayer. The spinner assembly can be externally fitted to the discharge nozzle, and includes an annular chamber surrounding a central post having a swirl chamber in its top. The central post includes longitudinal grooves, communicating with tangential grooves in an annular wall defining the swirl chamber. Apertures are provided in the base of the annular chamber such that pressurized liquid flows through the apertures and into the annular chamber, with a resulting reduction of velocity, and then along the longitudinal grooves and through the tangential grooves into the swirl chamber. A cap is provided which variably engages the discharge nozzle and which has at least a central projection on the inner side of its front face, and preferably an annular groove formed by an outer projection surrounding the central projection. The central projection may reversibly seal against the floor and/or annular wall of the swirl chamber, and the annular groove may seal over the annular wall.

60 Claims, 3 Drawing Sheets

SPINNER ASSEMBLY FOR A SPRAYER

Matter enclosed in heavy brackets [ ] appears in the original patent but forms no part of this reissue specification; matter printed in italics indicates the additions made by reissue.

FIELD OF THE INVENTION

The present invention is directed to a spinner assembly, for use with a discharge nozzle in a fluid dispenser such as a sprayer bottle, which may be assembled to the fluid discharge apparatus of the fluid dispenser from its exterior.

More particularly, the present invention is directed to a spinner assembly in which the spinner, priming valve, and compression spring positioned therebetween may be formed as a single piece, which may be assembled to the discharge nozzle from its exterior. The spinner assembly may form part of a discharge nozzle assembly which includes a cap adapted to fit over the spinner and variably engage the discharge nozzle.

DESCRIPTION OF BACKGROUND AND RELEVANT MATERIALS

Fluid dispenser, such as pump bottles, pump spray bottles, and in particular trigger sprayer bottles, are used to dispense a broad range of substances. Those substances include hand, face, and body lotions; and, cleaners for materials as diverse as wood, glass, vinyl, leather, suede, metals (such as aluminum, copper, brass, silver, and chrome), rubber (such as automobile tire brighteners), formica, ceramics, stainless steel, fabrics, painted surfaces, and the like.

The most commonly used type of fluid dispenser is probably the trigger-type sprayer bottle. (See, for example, TADA, U.S. Pat. No. 4,815,663, and European Patent Application No. 83110619.0, Publication No. 0 117 898, for illustrations and discussions of trigger-type sprayers.) Trigger-type sprayer bottles, while differing in specifics, generally share certain elements in common. Among these common elements are three referred to, for purposes of the present application, as the spinner, the priming valve, and the compression spring, which is located between the spinner and the priming valve. For purposes of convenience, these three elements are referred to collectively herein as the "spinner assembly".

The prior art spinner assemblies complicate the manufacture of the fluid dispensing apparatus into which they are incorporated because they are internal to those mechanisms. This is true even of the prior art one-piece spinner assemblies, such as that shown in TADA, U.S. Patent No. 4,815,663, FIG. 4a. As may be clearly seen from FIG. 1 of TADA, during assembly of the fluid dispensing apparatus, spinner assembly 60 must be placed within nozzle 56. This has at least two disadvantages compared with a spinner assembly which could be assembled to the fluid dispensing apparatus externally. First, the internal placement will require more time on the part of the assembler, slowing production time and increasing production costs. Second, should the spinner prove defective during quality control testing, the fluid dispensing apparatus must be disassembled in order to replace the defective spinner assembly.

There is a third disadvantage to the use of internal spinner assemblies, which relates to the need to provide the user of the fluid discharge apparatus with more than one configuration of fluid output. With the general exception of lotions, fluid dispenser are typically used to dispense liquids such as cleaning solutions. Because of the varied environments in which such dispensers may be used, and the extremely wide range of surfaces to which they may be applied, it is generally considered desireable to enable the user to select between different configurations of the discharged fluid. Most commonly, this selection provides the user with a choice between the spray configuration described above, and a stream configuration wherein the fluid is projected from the dispenser in a substantially coherent, cylindrical stream.

The prior art demonstrates that numerous attempts have been made to provide suitable selector mechanisms. STOESSER et al., U.S. Pat. No. 4,463,905, is directed to a foam-spraying apparatus wherein a liquid is first ejected from a hand dispensing pump through an atomizing nozzle, forming a spray, and the spray thus formed is then passed through foam-forming means. The foam-forming means includes a housing and a screen, and is operatively associated with the dispensing pump by a snap-fit mechanism (see, e.g., column 4, lines 42 et seq.).

TADA, U.S. Pat No. 4,350,298, is directed to an improvement in the nozzle cap of a foam dispenser, whereby the nozzle cap includes a plurality of arms forming an obstacle with which a liquid sprayed from an orifice of the foam dispenser collides. A plurality of foam outlet ports is provided between adjacent arms. The nozzle cap is moveable relative to the foam dispenser body between a sealing and a foaming position, and may be formed integrally with the foam dispenser nozzle through a hinge (see, e.g., column 3, lines 14 et seq., and claim 1).

DOBBS, U.S. Pat. No. 4,706,888, is directed to use of a rotatable nozzle cap having a plurality of longitudinal grooves which communicate with alternating radial and tangential channels. Rotation of the nozzle cap controls whether the fluid current passes along the longitudinal grooves and through the radial channels, producing a stream, or through the tangential channels, which impart a spin to the fluid current and produce a spray.

Co-pending application U.S. Ser. No. 07/533,454, filed June 5, 1990, is directed to a fluid discharge apparatus for imparting a stream configuration to a current of fluid, in the form of a nozzle containing a passageway having at least a receiving portion with a substantially rectilinear cross-section, and an issuing portion with a substantially curvilinear cross-section. A fluid current passing through the passageway thereby emerges from it in a stream configuration. In a preferred embodiment, this apparatus may take the form of a cover or cap, hingedly connected to the discharge orifice region of the sprayer so that it can be reversibly attached to that orifice.

These selector mechanisms must cope with the fact that the initial fluid configuration which they are designed to change is generated by an internal mechanism, namely, the internally-mounted spinner assembly. Thus, at the point at which the selector mechanism acts to change the fluid configuration, the fluid has already passed beyond the spinner assembly and through the discharge orifice. Much of the prior art therefore provides a selector mechanism in the form of some type of cover or cap which may be reversibly attached to or placed over the discharge orifice. This increases the number of parts used in the fluid discharge apparatus, with a consequent increase in production costs and time; complicates operation of the apparatus by the user, who must generally manually engage or disengage the selector mechanism in addition to unsealing the discharge orifice; and, any such selector mechanism is likely to decrease the force with which the fluid is projected onto the work area. Moreover, the design and efficiency of such selector mechanisms is complicated by the need to make the selector mechanism fluid-tight when it is in operation.

Also of interest in this field is TADA, U.S. Pat. No. 4,940,186. As shown, for example, in FIGS. 13, 16, 20, and 21, this document discloses a spinner 112 which consists of a bottomed hollow cylinder (see also claim 6). Through holes are cut into the rear surface of the bottom of the spinner to form liquid passages 114. These liquid passages 114 communicate with a circular recess, 118, which is made in the center of the distal end of the spinner, through tangential grooves 115. As described at for example, column 14, lines 7–28, in use pressurized liquid flows from nozzle 79 through liquid passages 114 and into recess 118. There are at least two drawbacks to this configuration. First, and with particular reference to FIGS. 16 and 20, even with cap 110 in the spray position wherein inner cylinder 122 of the cap is slightly moved away from the bottom of circular recess 118, fluid will not flow exclusively through tangential grooves 115 into circular recess 118 before exiting through orifice 113. Because of the clearance between the side wall of cylinder 122 and the side wall of circular recess 118, some fluid will also flow through liquid passages 114, into the gap between the front inner face of cap 110, and from there between the side wall of cylinder 122 and the side wall of circular recess 118, and thus into the circular recess. This will create significant turbulence in the circular recess, which may be expected to detract from the consistency of the resulting spray and/or to cause dripping at the outer opening of orifice 113. Second, because the fluid flows from the relatively large interior space of the bottomed hollow cylinder into relatively restricted liquid passages 114, and then directly through tangential grooves 115 and into circular recess 118, the fluid will have a relatively high velocity throughout its course from liquid passages 114 into circular recess 118. This will aggravate the turbulence problem referred to above, resulting in a correspondingly greater deterioration in spray quality and increased dripping.

In view of the above, it would be desireable to provide a spinner assembly which may be simply and efficiently assembled to a fluid dispensing apparatus from the exterior, and which may also cooperate directly with a selector mechanism, thereby simplifying production and use of the fluid dispenser while enhancing efficiency of operation and ease of use. It would also be desireable to provide a spinner assembly wherein the flow of pressurized liquid into the swirl chamber is controlled in a way which minimizes turbulence, thereby improving the characteristics of the output from the fluid dispensing apparatus and minimizing or even substantially eliminating dripping from the discharge orifice during use.

SUMMARY OF THE INVENTION

In accordance with the above objectives, there is provided a spinner. Assembly adapted for external engagement with a discharge nozzle. The spinner assembly includes a priming valve configured to mate with a priming valve seat, biasing means for biasing the priming valve towards the priming valve seat, and a spinner head.

The spinner head includes spinner means for imparting radial spin to a current of fluid passing through the spinner means, and sealing means for providing a fluid-tight seal between the spinner head and a nozzle cap configured to fit over the sealing means and engage the discharge nozzle.

The spinner head may include an annular sealing flange, a post positioned within the annular sealing flange, and an annular chamber defined therebetween. The annular chamber may further include a fluid input end, having at least one aperture which communicates the annular chamber with the interior of the discharge nozzle. The annular chamber preferably has a larger cross-section than the at least one aperture, so that the velocity of a fluid projected along the interior of the discharge nozzle and through the at least one aperture will decrease when the fluid enters the annular chamber. Preferably there will be a plurality of apertures, evenly spaced around and adjacent to the periphery of the base of the post.

The post includes at least one longitudinal groove, which begins at the top of the post and extends along at least a portion of its length. Preferably there will be a plurality of longitudinal grooves, evenly spaced around the circumference of the post. At least one of the longitudinal grooves and at least one of the apertures should be aligned on a common radius of the annular chamber.

In a preferred embodiment, there are at least two longitudinal grooves and at least two apertures, and each of the longitudinal grooves is aligned with one of the apertures on a common radius of the annular chamber. In a particularly preferred embodiment there are two longitudinal grooves and four apertures, with the two longitudinal grooves being spaced substantially at a 180° interval from each other around the circumference of the post and the four apertures being evenly spaced substantially at 90° intervals around the circumference of the post.

The top of the post includes a swirl chamber surrounded by an annular wall. The annular wall has at least one tangential groove in it, communicating the swirl chamber with the annular chamber. The at least one tangential groove, which may extend to substantially the full depth of the annular wall, should have substantially parallel sides, and its central axis should not intersect the axis of the swirl chamber. This results in fluid acquiring a radial spin as it passes through the tangential groove into the swirl chamber.

The at least one longitudinal groove may communicate with the at least one tangential groove. Preferably, there are two tangential grooves, spaced substantially at a 180° interval from each other around the circumference of the annular wall, and two tangential grooves, also spaced substantially at a 180° interval from each other around the circumference of the annular wall. Most preferably, this configuration includes four apertures, evenly spaced substantially at 90° intervals around the circumference of the post, with each of the longitudinal grooves being aligned with one of the apertures on a common radius of the annular chamber.

The biasing means may be positioned between the priming valve and the spinner head, and the priming valve, biasing means, and spinner head may share a common longitudinal axis. The biasing means may be a spring, which includes at least one approximately sinusoidal wave form. Preferably, the spring includes a plurality of approximately sinusoidal wave forms, in an alternating 180° configuration.

The priming valve may further include centering means for centering the priming valve in the priming valve seat when the spinner assembly is engaged with the discharge nozzle. In particular, the priming valve may have a substantially continuously decreasing cross-section in the direction towards the priming valve seat, thereby effecting centering of the priming valve in the priming valve seat when the spinner assembly is engaged with the discharge nozzle. Moreover, the priming valve may terminate in a longitudinal extension having a smaller cross-section than the priming valve seat. This longitudinal extension is configured to ensure proper alignment of the priming valve with the priming valve seat when the spinner assembly is engaged with the discharge nozzle.

The present invention is also directed to a cap adapted to fit over the spinner assembly as defined above, and to variably engage the discharge nozzle. This cap may include a substantially annular side wall and a front face, with the front face having an outer side, an inner side, and an orifice. The inner side may include an annular central projection surrounding the orifice and having a height at least equal to the height of the annular wall. This annular central projection should be configured and positioned to sealingly engage the inside of the annular wall when the cap is substantially completely engaged with the discharge nozzle.

The cap may be threadably engageable with the discharge nozzle such that rotation of the cap about its axis in a first direction brings the cap into increasing engagement with the discharge nozzle and moves the central projection towards the swirl chamber, while rotation of the cap about its axis in a second direction brings the cap into decreasing engagement with the discharge nozzle and moves the central projection away from the swirl chamber. Alternatively, the cap may be slidably engageable with the discharge nozzle, such that sliding of the cap along its axis in a first direction brings the cap into increasing engagement with the discharge nozzle and moves the central projection towards the swirl chamber, while sliding of the cap along its axis in a second direction brings the cap into decreasing engagement with the discharge nozzle and moves the central projection away from the swirl chamber.

The inner face of the cap may include an annular outer projection surrounding and spaced from the central projection. Between the central projection and the outer projection there is defined an annular groove, having a width substantially identical to the width of the annular wall. In this manner the annular wall may be sealingly engaged between the central projection and the outer projection when the cap is substantially completely engaged with the discharge nozzle. The outer projection should have a height sufficient to extend at least to the bottom of the tangential groove when the cap is substantially completely engaged with the discharge nozzle.

The surface of the inner side of the cap is preferably substantially smooth and, except for the central projection and, where present, the outer projection, substantially flat.

In an alternative embodiment, the present invention is directed to a spinner and discharge nozzle assembly in a trigger sprayer for dispensing a liquid. The spinner and discharge nozzle assembly include a nozzle assembly having a liquid nozzle chamber therein, and a spinner assembly having a spinner head in sealing engagement with the nozzle assembly at a downstream end thereof.

The spinner head may further include a base portion, a central post extending downstream from the base portion, and an annular flange extending downstream from the base portion. The annular flange surrounds the base post and is spaced outwardly therefrom, such that an annular liquid chamber is defined therebetween. The base has aperture means therethrough communicating the nozzle chamber with the annular chamber, and the annular chamber imparts a reduction in velocity of the liquid when the liquid enters the annular chamber from the aperture means.

A swirl chamber is located at the downstream end of the post, which has an annular wall defining a swirl chamber therein and passage means communicating the annular chamber with the swirl chamber. The passage means may include at least one tangential groove, and at least one longitudinal groove, in the wall of the post. The longitudinal groove opens toward and is located within the annular chamber, and communicates with the tangential groove. In this configuration, liquid from the nozzle chamber flows through the aperture means, then into the annular chamber, into the longitudinal groove, and then through the tangential groove and into the swirl chamber; the liquid flows at a reduced velocity in the annular chamber prior to entering the tangential groove.

The longitudinal groove and the tangential groove may be aligned along a common radius of the spinner head. Preferably, there are at least two diametrically opposed longitudinal grooves, and/or at least two diametrically opposed tangential grooves, with each of the longitudinal grooves being aligned on a common radius of the spinner head with a tangential groove. Most preferably, there are also four apertures in the base, evenly spaced around the circumference of the post.

The present invention also includes, in combination with this assembly, a cap adapted to fit over the spinner head and variably engage the discharge nozzle between open and closed positions. The cap includes a substantially annular side wall and a front face, with the front face having an outer side, an inner side, and an orifice. The inner side has an annular groove surrounding the orifice for receiving the annular wall at the downstream end of the spinner post. Sealing means may be provided for establishing a liquid-tight seal between the annular flange of the spinner head and the annular side wall of the cap.

The fit between the inner circumferential surface of the inner wall and the inner circumferential surface of the annular groove provides a liquid sealing engagement therebetween, preventing liquid from flowing between the engaging surfaces of the annular wall and the annular groove. Preferably, the width of the annular groove and the width of the annular wall are substantially equal, to provide liquid sealing engagement both between the inner circumferential surface of the annular wall and the inner circumferential surface of the annular groove, and between the outer circumferential surface of the annular wall and the outer circumferential surface of the annular groove. In this manner, the flow of liquid between the engaging surface of the annular wall and the annular groove is prevented.

Preferably, with the cap in its closed position the outer circumferential surface of the annular groove extends at least to the bottom of the tangential groove, and the longitudinal groove extends from the tangential groove past the outer circumferential surface of the annular groove. It is also preferred that the tangential groove extend to substantially the full depth of the annular wall.

The cap may have a central projection that seals against the floor of the swirl chamber with the cap in its closed position, to block the flow of liquid through the orifice.

The spinner and discharge nozzle assembly may further include a priming valve configured to mate with a priming valve seat, and a spring extending between the base of the spinner head and the priming valve. The spinner head, spring, and priming valve are preferably of integral, one-piece, molded plastic construction.

DESCRIPTION OF PREFERRED EMBODIMENTS

Figure 1:
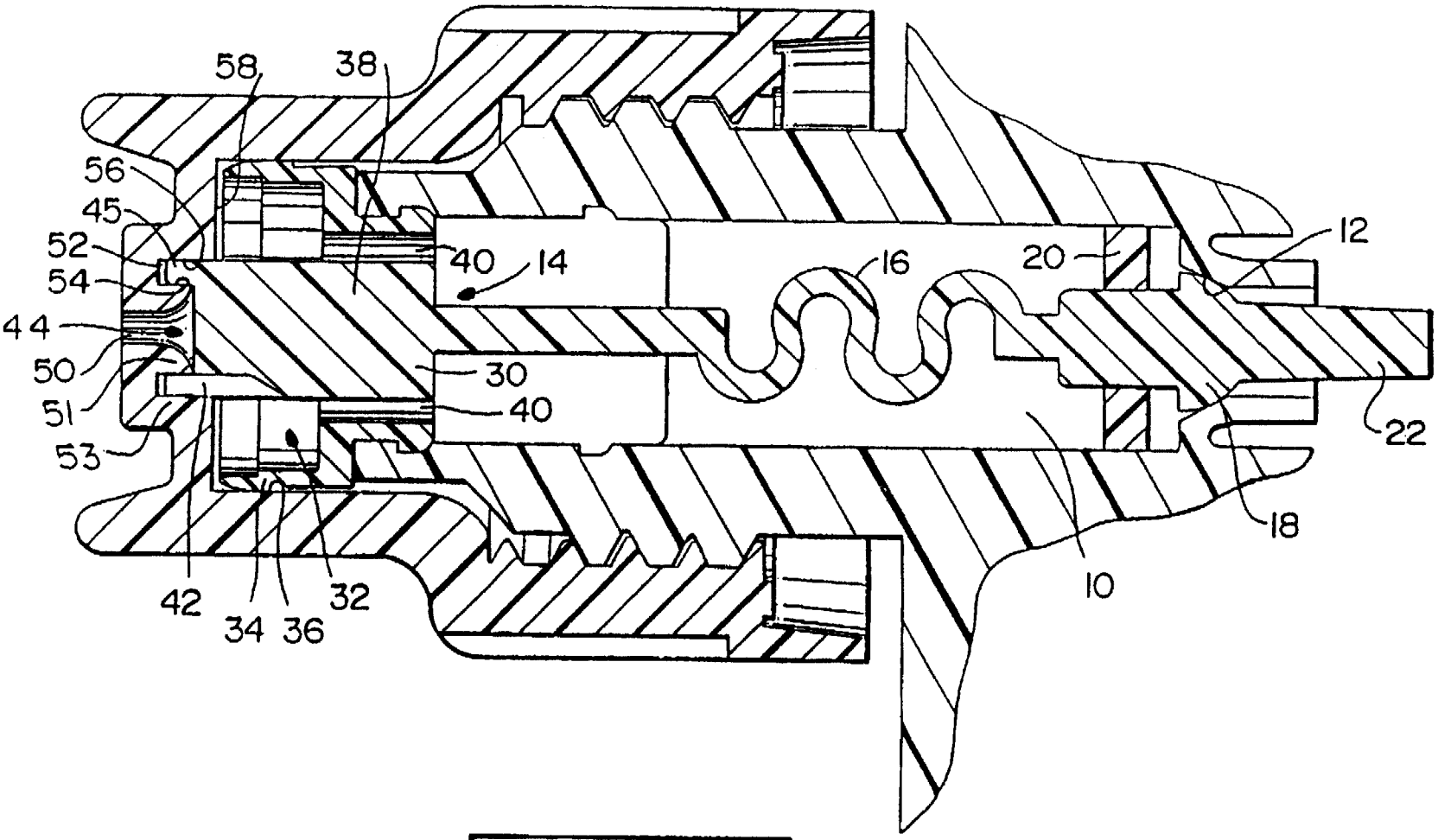
FIG. 1 depicts the cap, spinner, and discharge nozzle assembly according to the present invention. In the position shown, the cap is fully engaged with the discharge nozzle, such that the annular groove 52 defined by central projection 51 and outer projection 53 on the inner face of the cap is sealingly engaged with the annular wall 45 surrounding the swirl chamber 44.

In accordance with the above goals, there is provided by the present invention a one-piece spinner assembly which can be assembled to a fluid dispensing apparatus from the exterior. Moreover, due to the placement and configuration of the spinner portion of the spinner assembly, the spinner can cooperate simply and efficiently with a selector mechanism for controlling both the flow and shape of fluid projected from the fluid dispenser.

As used herein, the term "fluid dispensing apparatus" refers to the apparatus or mechanism used to draw up a fluid from a fluid container and expel it in a desired direction and/or configuration. Thus, for a trigger-type sprayer, the fluid dispensing apparatus would be the trigger sprayer assembly. For a pump-type fluid dispenser, the fluid dispensing apparatus would be the pump mechanism.

The term "fluid container" refers to the container used to store fluid as a reservoir to be drawn upon by the fluid dispensing apparatus. Generally, this will simply be a bottle, which may be, for example, glass or plastic, and which may assume a wide range of shapes, sizes, colors, and configurations without departing from the scope of the present invention.

The term "fluid dispenser" describes the complete assembly of housing, fluid dispensing apparatus, and fluid container. In other words, the fluid dispenser is what the end user would pick up and use to dispense fluid.

The term "stream configuration" means a substantially coherent, cylindrical column of fluid, and is to be distinguished from a spray configuration, in which a fluid is dispersed in an expanding conical pattern.

For purposes of providing a specific context within which to discuss the present invention, in the following discussion reference may be made to the parts or operation of a trigger-type sprayer bottle, such as is commonly used to package liquid cleaner products. However, it is to be understood that any such references are for purposes of illustration only, and in no way constitute any express or implied limitation on the scope of the present invention.

As discussed briefly earlier, a spinner assembly consists of the spinner, the priming valve, and the compression spring which connects the spinner and the priming valve. Each portion of the spinner assembly has a particular function.

The priming valve—acting under the force of the compression spring—serves to control the flow of fluid from the fluid container as it passes towards the discharge orifice. When fluid is not being discharged, the compression spring urges the priming valve into a valve seat through which the fluid must move in its passage towards the discharge orifice. During use of the sprayer this is necessary to enable the fluid dispensing apparatus to 'prime', that is, to permit the fluid to be drawn up from the fluid container on the return stroke of the trigger or pump mechanism. When the sprayer is not in use, the sealing of the valve seat by the priming valve prevents fluid from leaking out of the discharge orifice.

The spinner shapes the fluid into a desired configuration, such as spray or stream, before it passes through the discharge orifice. One common form of spinner involves a central, cylindrical chamber, having two or more inlet ports which are shaped and/or positioned to impart a spin to the fluid passing through them into the central chamber. Thus, when the fluid passes through the discharge orifice and exits the sprayer, the spinning motion causes the fluid to disperse radially, while the forward momentum imparted by the sprayer trigger mechanism causes the fluid to project forward, resulting in the expanding conical body of droplets characteristic of a spray.

Turning now to the specifics of the present invention, and with reference to the accompanying Figures, the trigger sprayer includes a nozzle, a spinner assembly, and a cap. The nozzle has a nozzle fluid chamber 10 and a valve seat 12 at the rear end.

The spinner assembly has a spinner head 14, a spring 16, and a priming valve 18 that seats within the valve seat 12. It also includes a centering guide 20 and a centering probe 22. The spinner assembly is of one-piece construction.

The spinner head 14 is essentially a solid core with an annular chamber 32 formed in the top or forward end of the head. The annular chamber 32 defines an outer annular sealing flange 34 that provides a fluid-tight seal at 36 with an interior surface of the cap, and also defines a central post 38. The spring 16 extends from the bottom or rearward end of the head.

Apertures 40 extend through the base of the annular chamber and communicate the nozzle chamber with the annular chamber 32. The apertures 40 are located just outwardly of the post 38, adjacent its periphery. Longitudinal grooves 42 extend along opposite sides of the post 38. The grooves are generally U-shaped in cross-section and open toward the annular chamber 32.

A swirl chamber 44 is located in the top or front of the post 38 within annular wall 45. Tangential grooves 46 are located in the annular wall 45 and extend between the longitudinal grooves 42 and swirl chamber 44. The tangential grooves preferably extend the full depth of the annular wall 45.

The cap threadingly engages the nozzle and has an orifice 50 in its front face. On the inner side of the front face of the cap, surrounding the orifice, is a central projection 51. Preferably, central projection 51 is surrounded by an outer projection 53, defining therebetween an annular groove 52 having an inner circumferential surface 54 and an outer circumferential surface 56. Preferably, the inner side 58 of the front face of the cap is smooth and extends from the bottom of the outer circumferential surface 56 to the annular side wall of the cap such that the inner surface 58 defines a generally smooth flat disk. This smoothness helps minimize turbulence in the fluid entering the annular chamber which, as will be explained in greater detail below, improves the characteristics of the sprayer produced by the spinner assembly.

While the above discussion refers to a cap threadingly engaging the nozzle, this mode of engagement is neither critical to the practice of the present invention nor limiting on the scope thereof. Any conventional means of engaging the cap with the nozzle may be used in conjunction with the present invention, including, by way of non-limiting example, sliding engagement.

The annular wall 45 of the post 38, and the annular groove 52, are dimensioned to provide a snug, or essentially zero clearance, fit between the inner surface of the annular wall 45 and the inner circumferential surface 54 of the cap, and also between the outer surface of the annular wall 45 and the outer circumferential surface 56, so that virtually no fluid is allowed to pass between these surfaces. The length of the inner circumferential surface 54 is somewhat greater than the depth of the annular wall 45 so that the rear of the circumferential surface 54 can contact the bottom of the swirl chamber 44 with the cap screwed in to its closed position to seal off the orifice 50. The outer circumferential surface 56 preferably should be at least as long as the inner circumferential surface 54, and preferably somewhat longer so that it extends at least to the bottom of the tangential grooves 46.

The longitudinal grooves 42 extend from the bottom on the tangential grooves 46 rearwardly to a location past the outer circumferential surface 56, so that fluid in the chamber 32 is always allowed to pass into the tangential grooves 46 without significant restriction even with the cap closed. The longitudinal grooves 42 may extend rearwardly all the way back to the forward end of the apertures 40.

In operation, liquid from the nozzle chamber 10 flows forwardly through the apertures 40 in the spinner head and into the enlarged annular chamber 32, with a resulting drop in velocity. The liquid in the chamber 32 enters the longitudinal grooves 42 and from there flows into the tangential grooves 46. With the cap in the closed position, the liquid is blocked from passage into the orifice 50 because of the contact of the rearward end of the inner circumferential surface 54 with the bottom of the swirl chamber 44, and because of the sealing engagement between the inner circumferential surface 54 and the inner surface of the annular wall 45 as provided by the snug fit between those surfaces.

With the cap unscrewed such that the rearward end of the circumferential surface 54 moves away from the bottom of the swirl chamber 44, liquid is allowed to pass from the longitudinal grooves 42 through the openings 60 in the tangential grooves, which openings 60 are created by the displacement of the circumferential surface 54 away from the bottom of the swirl chamber 44. Liquid is not allowed to flow forwardly between the outer circumferential surface 56 and the outer surface of the annular wall 45 because of the close sealing engagement between these surfaces. Hence, the reduced velocity liquid flow from the annular chamber 32 occurs substantially only along a direct path through the openings 60 in the tangential grooves created by the displacement of the cap from its closed position. This direct path is ensured by the sealing engagements of the circumferential surfaces of the annular wall 45.

As a result, there is always ample realtively low velocity liquid present at the tangential grooves 46, and the liquid flow to the openings 60 is relatively smooth to reduce the turbulence otherwise created if the liquid were allowed to flow forwardly past the outer surface of the annular wall 45, over the end of the wall, and then back rearwardly past the inner surface of the annular wall to the tangential grooves. This produces a superior quality mist or spray, and additionally substantially eliminates the dripping problem which is common in prior art trigger sprayers.

Figure 2:
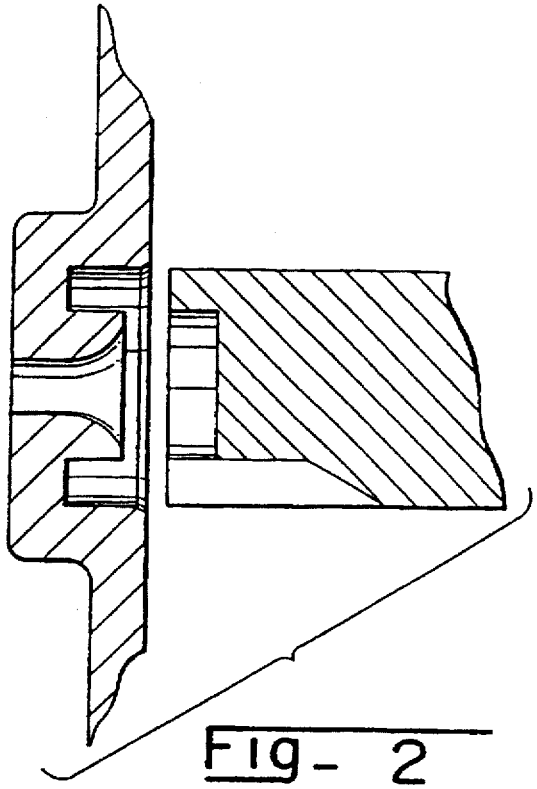
FIG. 2 is a partial view showing the cap backed off from the discharge nozzle to such an extent that there is no overlap between the annular groove 52 and the annular wall 45 of the swirl chamber 44. In this position, the assembly will produce a stream.
Figure 3:
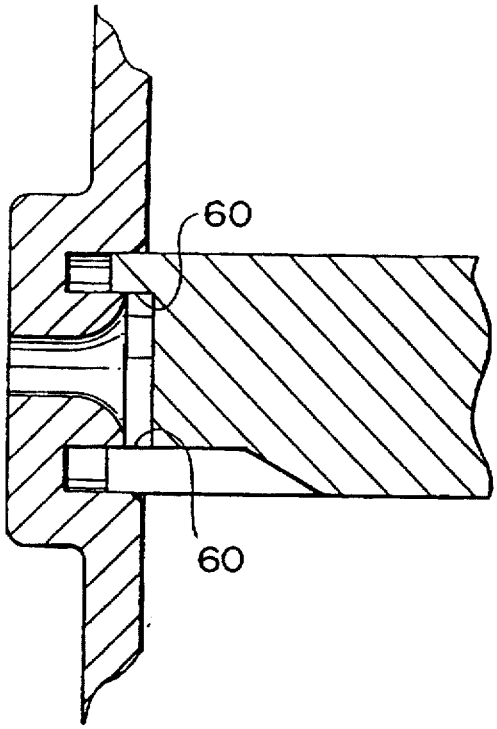
FIG. 3 is another partial view showing a position intermediate to that of FIG. 1 and FIG. 2. The cap is backed off sufficiently to allow fluid to flow through the resulting apertures 60 in the tangential grooves in the annular wall and into the swirl chamber, but the annular groove is overlapping the annular wall such that fluid cannot enter the swirl chamber other than through the tangential grooves. In this position, the assembly will produce a spray.
Figure 4:
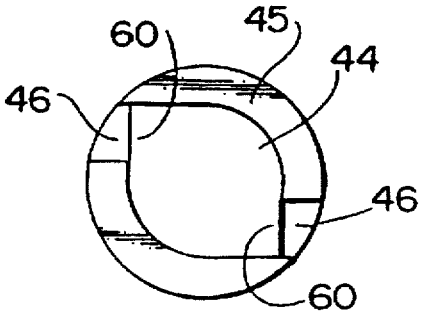
FIG. 4 is a top plan view of the swirl chamber 44, showing one configuration of the tangential groove 46 in the annular wall 45.
Figure 5:
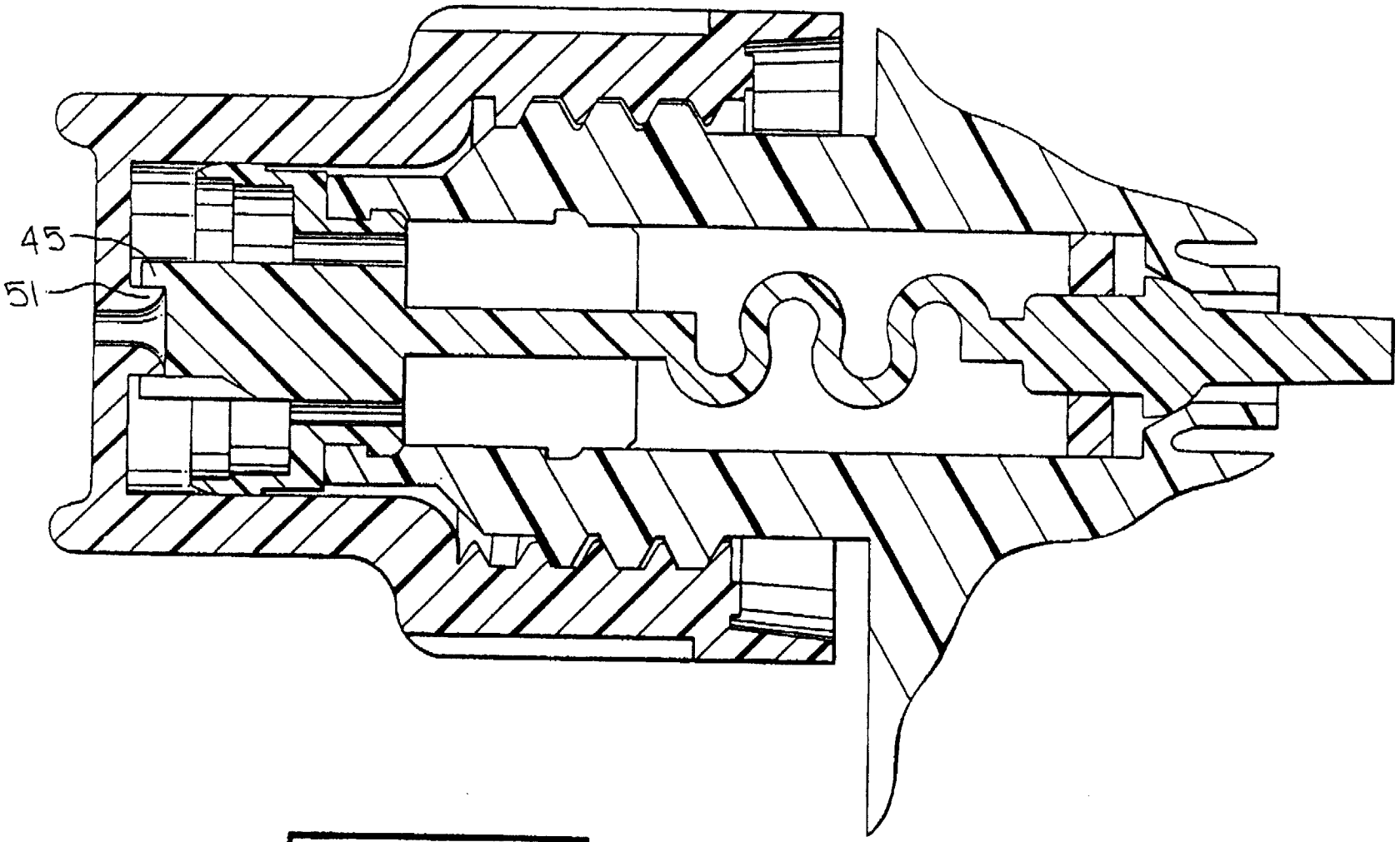
FIG. 5 is identical to FIG. 1, except that the inner side of the front face of the cap is shown having only central projection 51 engaging annular wall 45, without the outer projection (the remaining reference numerals have been omitted for clarity).

As the cap is further unscrewed such that the openings 60 become larger (see FIG. 3), the liquid flow into the swirl chamber 44 becomes greater to produce a coarser spray. As the cap is unscrewed still further (see FIG. 2), the liquid flow becomes so great as to produce a stream from the orifice 50.

The present invention has of necessity been discussed herein by reference to certain specific methods, materials, and configurations. It is to be understood that the discussion of these specific methods, materials, and configurations in no way constitutes any limitation on the scope of the present invention, which extends to any and all alternative methods, materials, and configurations suitable for accomplishing the ends of the present invention.

In particular, while the spinner assembly to which the present application is directed was developed in the context of a trigger-type sprayer bottle, its use is not limited thereto and the claims of the present application should be understood to extend to any and all fluid dispensers to which the presently claimed invention may be readily applied or adapted.

What we claim is:

1. A spinner assembly adapted for external engagement with a discharge nozzle, said spinner assembly comprising:

a) a priming valve configured to mate with a priming valve seat;

b) biasing means for biasing said priming valve towards the priming valve seat; and c) a spinner head, said spinner head comprising:

i) spinner means for imparting radial spin to a current of fluid passing through said spinner means, and ii) an annular sealing flange for providing a fluid-tight seal about its entire circumference between said spinner head and a nozzle cap configured to fit over said annular sealing flange and engage the discharge nozzle, said spinner head being of integral, one-piece construction.

2. The spinner assembly as defined in claim 1, wherein said spinner head further comprises a post positioned within said annular sealing flange, and an annular chamber defined therebetween.

3. The spinner assembly as defined in claim 2, wherein said spinner head further comprises a swirl chamber, and wherein said annular chamber comprises a fluid input having at least one aperture therein communicating said annular chamber with the interior of the discharge nozzle, and a fluid output communicating said annular chamber with said swirl chamber.

4. The spinner assembly as defined in claim 1, wherein said biasing means are positioned between said priming valve and said spinner head.

5. The spinner assembly as defined in claim 4, wherein said priming valve, biasing means, and spinner head share a common longitudinal axis.

6. The spinner assembly as defined in claim 5, wherein said biasing means comprise a spring.

7. The spinner assembly as defined in claim 6, wherein said spring comprises at least one approximately sinusoidal wave form, said spinner assembly being of integral, one-piece construction.

8. The spinner assembly as defined in claim 7, wherein said spring comprises a plurality of approximately sinusoidal wave forms in an alternating 180° configuration.

9. The spinner assembly as defined in claim 1, wherein said priming valve comprises centering means for centering said priming valve in the priming valve seat when said spinner assembly is engaged with the discharge nozzle.

10. The spinner assembly as defined in claim 9, wherein said centering means comprises a substantially continuously decreasing cross-section on said priming valve in the direction towards the priming valve seat.

11. The spinner assembly as defined in claim 10, wherein said centering means further comprises a longitudinal extension on said priming valve having a smaller cross-section than the priming valve seat, said longitudinal extension being configured to ensure proper alignment of said priming valve with the priming valve seat when said spinner assembly is engaged with the discharge nozzle.

[12. In a trigger sprayer for dispensing a liquid, a spinner and discharge nozzle assembly comprising:

a) a nozzle assembly having a liquid nozzle chamber therein;

b) a spinner assembly having a spinner head in sealing engagement with said nozzle assembly at a downstream end thereof, said spinner head further comprising:

i) a base portion;

ii) a central post extending downstream from said base portion; and iii) an annular flange extending downstream from said base portion, said annular flange surrounding said post and spaced outwardly therefrom to define an annular liquid chamber therebetween;

iv) said base portion having aperture means therethrough communicating said nozzle chamber with said annular chamber, said annular chamber imparting a reduction in velocity of the liquid upon entering said annular chamber from said aperture, said spinner head being of integral, one-piece construction.]

[13. The spinner and discharge nozzle assembly as defined by claim 12, wherein said spinner head further comprises a swirl chamber at the downstream end of said post.]

[14. The spinner and discharge nozzle assembly as defined by claim 13, wherein] *A trigger sprayer for dispensing a liquid comprising:*

*a) a nozzle assembly having a liquid nozzle chamber therein;*

*b) a spinner in sealing engagement with said nozzle assembly at a downstream end thereof, said spinner further comprising:*

*i) a base portion;*

*ii) a central post extending downstream from said base portion; and*

*iii) an annular flange extending downstream from said base portion, said annular flange surrounding said post and spaced outwardly therefrom to define an annular liquid chamber therebetween;*

*iv) said base portion having aperture means therethrough communicating said nozzle chamber with said annular chamber, said annular chamber imparting a reduction in velocity of the liquid upon entering said annular chamber from said aperture, said spinner being of integral one-piece construction;*

*said spinner further comprises a swirl chamber at the downstream end of said post; and* said downstream end of said post has an annular wall defining the swirl chamber therein, and passage means communicating said annular chamber with said swirl chamber.

15. The [spinner and discharge nozzle assembly] *trigger sprayer* as defined by claim [16] *14*, wherein said passage means comprises at least one tangential groove in said wall.

16. The [spinner and discharge nozzle assembly] *trigger sprayer* as defined by claim 15, wherein said passage means further comprises at least one longitudinal groove in the wall of said post, said groove opening toward and being located within said annular chamber and communicating with said tangential groove, whereby liquid from said nozzle chamber flows through said aperture means, then into said annular chamber, into said longitudinal groove, and then through said tangential groove and into said swirl chamber, the liquid flowing at a reduced velocity in said annular chamber prior to entering said tangential groove.

17. The [spinner and discharge nozzle assembly] *trigger sprayer* as defined by claim 16, wherein said longitudinal groove and said tangential groove are aligned along a common radius of said spinner [head].

18. The [spinner and discharge nozzle assembly] *trigger sprayer* as defined by claim 17, wherein there are at least two diametrically opposed longitudinal grooves, and at least two diametrically opposed tangential grooves, each of said longitudinal grooves being aligned on a common radius of said spinner [head] with one of said tangential [groove] *grooves*.

19. The [spinner and discharge nozzle assembly] *trigger sprayer* as defined by claim 18, wherein said aperture means comprises four apertures in said base evenly spaced around the circumference of said post.

20. [In combination with the assembly] *The trigger sprayer* as defined by claim 16 *further comprising*, a cap adapted to fit over the spinner [head] and variably engage the discharge nozzle between open and closed positions, said cap comprising a substantially annular side wall and a front face, said front face having an outer side, an inner side, and an orifice, said inner side having an annular groove surrounding said orifice for receiving the annular wall at the downstream end of said post, the fit between the inner circumferential surface of said annular wall and the inner circumferential surface of said annular groove providing a liquid sealing engagement therebetween, whereby liquid is prevented from flowing between the engaging surfaces of the annular wall and the annular groove.

21. The [combination of] *trigger sprayer as defined by* claim 20, wherein the width of said annular groove and the width of said annular wall are substantially equal to provide liquid sealing engagement both between the inner circumferential surface of said annular wall and the inner circumferential surface of said annular groove, and between the outer circumferential surface of said annular wall and the outer circumferential surface of said annular groove, whereby the flow of liquid is prevented between the engaging surface of said annular wall and the annular groove.

22. The [combination of] *trigger sprayer as defined by* claim 21, wherein the outer circumferential surface of said annular groove extends at least to the bottom of said tangential groove with said cap in its closed position.

23. The [combination of] *trigger sprayer as defined by* claim 22, wherein said longitudinal groove extends from said tangential groove past the outer circumferential surface of said annular groove with said cap in its closed position.

24. The [combination of] *trigger sprayer as defined by* claim 23, wherein said tangential groove extends to substantially the full depth of the annular wall.

25. The [combination of] *trigger sprayer as defined by* claim 24, wherein the inner side of said front face is substantially entirely smooth outwardly of said annular groove.

26. The [combination of] *trigger sprayer as defined by* claim 20, wherein said cap has a central projection that seals against the floor of the swirl chamber with the cap in its closed position to block the flow of liquid through the orifice.

27. The [spinner and discharge nozzle assembly] *trigger sprayer* as defined by claim [12] *14*, further comprising a priming valve configured to mate with a priming valve seat, and a spring extending between the base of said spinner [head] and said priming valve, said spinner [head], spring, and priming valve being of integral, one-piece, molded plastic construction.

28. The [combination] *trigger sprayer* as defined in claim 20, wherein said annular flange comprises sealing means for providing a liquid-tight seal between said spinner [head] and the annular side wall of said cap.

29. [In a] *A* trigger sprayer for dispensing a liquid[, a cap, spinner, and discharge nozzle assembly] comprising:

a) a nozzle assembly having a liquid nozzle chamber therein;

b) a spinner [assembly having a spinner head] in sealing engagement with said nozzle assembly at a downstream end thereof, said spinner [head] further comprising:

i) a base portion;

ii) a central post extending downstream from said base portion; and iii) an annular flange extending downstream from said base portion, said annular flange surrounding said post and spaced outwardly therefrom to define an annular liquid chamber therebetween;

iv) said base portion having aperture means therethrough communicating said nozzle chamber with said annular chamber;

v) the downstream end of said post having an annular wall defining a swirl chamber therein, said annular wall having at least one tangential groove therein;

vi) at least one longitudinal groove in said post extending from said tangential groove in an upstream direction, said groove opening toward and being located within said annular chamber and communicating with said tangential groove, said spinner [head] being of integral, one-piece construction;

c) a cap adapted to fit over the spinner [head] and variably engage the discharge nozzle between open and closed positions, said cap comprising a substantially annular side wall and a front face, said front face having an outer side, an inner side, and an orifice in the center thereof, said inner side having an annular groove surrounding said orifice for receiving the annular wall at the downstream end of said post, the fit between the inner circumferential surface of said annular wall and the inner circumferential surface of said annular groove providing a liquid sealing engagement therebetween, the outer circumferential surface of said annular groove extending at least to the bottom of said tangential groove with said cap in its closed position, said longitudinal groove extending from said tangential groove past the outer circumferential surface of said annular groove with said cap in its closed position;

d) whereby, with the cap in said open position, liquid from said nozzle chamber flows through said aperture means, then into said annular chamber, into said longitudinal groove, and then through said tangential groove and into said swirl chamber, the liquid flowing at a reduced velocity in said annular chamber prior to entering said tangential groove.

30. The [cap, spinner and discharge nozzle assembly] *trigger sprayer* of claim 29 wherein the width of said annular groove and the width of said annular wall are substantially equal to provide liquid sealing engagement both between the inner circumferential surface of said annular wall and the inner circumferential surface of said annular groove, and between the outer circumferential surface of said annular wall and the outer circumferential surface of said annular groove to prevent the flow of liquid between the engaging surfaces of said annular wall and annular groove.

31. The [cap, spinner, and discharge nozzle assembly] *trigger sprayer* as defined by claim 30 wherein said tangential groove extends to substantially the full depth of the annular wall.

32. The [cap, spinner, and discharge nozzle assembly] *trigger sprayer* as defined by claim 31 wherein there are at least two diametrically opposed grooves.

33. The [cap, spinner, and discharge nozzle assembly] *trigger sprayer* as defined by claim 29 wherein the inner side of said cap has an annular central projection surrounding said orifice, said projection engaging the floor of the swirl chamber to block the flow of liquid to said orifice with the cap in its closed position.

34. The [cap, spinner, and discharge nozzle assembly] *trigger sprayer* as defined by claim 29, wherein said annular flange comprises sealing means for providing a liquid-tight seal between said spinner [head] and the annular side wall of said cap.

35. The [cap, spinner, and discharge nozzle assembly] *trigger sprayer* as defined by claim 29 further comprising a priming valve configured to mate with a priming valve seat, and a spring between the base of said spinner [head] and said priming valve, said spinner [head], spring, and priming valve being of integral, one-piece, molded plastic construction.

[36. A spinner assembly comprising a spinner head having a swirl chamber, an annular sealing flange, and a post positioned within said annular sealing flange, said post and annular sealing flange defining an annular chamber therebetween, said annular chamber having a fluid input with at least one aperture therein adapted to communicate said annular chamber with the interior of a discharge nozzle and a fluid output communicating said annular chamber with said swirl chamber, said spinner head being of integral, one-piece, molded plastic construction.]

37. The spinner [assembly] as defined by claim [36] *38*, wherein said annular chamber has a larger cross-section than said at least one aperture, whereby the velocity of a fluid projected along the interior of the discharge nozzle and through said at least one aperture decreases upon entering said annular chamber.

38. [The spinner assembly as defined by claim 36, wherein said at least one aperture comprises] *A spinner comprising a swirl chamber, an annular sealing flange, and a post positioned within said annular sealing flange, said post and annular sealing flange defining an annular chamber therebetween, said annular chamber having a fluid input with* a plurality of apertures *therein adapted to communicate said annular chamber with the interior of a discharge nozzle*, said apertures being evenly spaced around and adjacent to the periphery of the base of said post, *and a fluid output communicating said annular chamber with said swirl chamber, said spinner being of integral, one-piece, molded plastic construction.*

39. The spinner [assembly] as defined by claim 38, wherein said post comprises at least one longitudinal groove commencing at the top of said post and extending along at least a portion of its length.

40. The spinner [assembly] as defined by claim 39, wherein said at least one longitudinal groove further comprises a plurality of longitudinal grooves, said longitudinal grooves being evenly spaced around the circumference of said post.

41. The spinner [assembly] as defined by claim 40, wherein at least one of said longitudinal grooves and at least one of said apertures are aligned on a common radius of said annular chamber.

42. The spinner [assembly] as defined by claim 41, wherein said at least one longitudinal groove further comprises at least two longitudinal grooves and said at least one aperture comprises at least two apertures, wherein each of said longitudinal grooves is aligned with one of said apertures on a common radius of said annular chamber.

43. The spinner [assembly] as defined by claim 42, wherein said at least one longitudinal groove comprises two longitudinal grooves and wherein said at least one aperture comprises four apertures, said two longitudinal grooves being spaced substantially at a 180° interval from each other around the circumference of said post and said four apertures being evenly spaced substantially at 90° intervals around the circumference of said post.

44. [The spinner assembly as defined by claim 36, wherein] *A spinner comprising a swirl chamber, an annular sealing flange, and a post positioned within said annular sealing flange, said post and annular sealing flange defining an annular chamber therebetween, said annular chamber having a fluid input with at least one aperture therein adapted to communicate said annular chamber with the interior of a discharge nozzle and a fluid output communicating said annular chamber with said swirl chamber, said spinner being of integral, one-piece, molded plastic construction, and* the swirl chamber is at the top of the post and is surrounded by an annular wall, said annular wall having at least one tangential groove therein communicating said swirl chamber with said annular chamber.

45. The spinner [assembly] as defined by claim 44, wherein said at least one tangential groove has substantially parallel sides, and further wherein the central axis of said at least one tangential groove does not intersect the axis of said swirl chamber, whereby fluid passing through said tangential groove into said swirl chamber acquires a radial spin.

46. The spinner [assembly] as defined by claim 45, comprising two tangential grooves spaced substantially at a 180 interval from each other around the circumference of said annular wall.

47. The spinner [assembly] as defined by claim 44, wherein said at least one tangential groove extends to substantially the full depth of said annular wall.

48. The spinner [assembly] as defined by claim 47, comprising two tangential grooves spaced substantially at a 180° interval from each other around the circumference of said annular wall.

49. The spinner [assembly] as defined by claim 44, wherein said post comprises at least one longitudinal groove commencing at the top of said post and extending along at least a portion of its length, and wherein said at least one longitudinal groove communicates with said at least one tangential groove.

50. The spinner [assembly] as defined by claim 49, comprising two tangential grooves spaced substantially at a 180° interval from each other around the circumference of said annular wall and two longitudinal grooves spaced substantially at a 180° interval from each other around the circumference of said post.

51. The spinner [assembly] as defined by claim 50, further comprising four apertures evenly spaced substantially at 90° intervals around the circumference of said post, wherein each of said longitudinal grooves is aligned with one of said apertures on a common radius of said annular chamber.

52. A *trigger sprayer for dispensing a liquid comprising:*

*a discharge nozzle having an interior;*

*a spinner having a swirl chamber, an annular sealing flange, and a post positioned within said annular sealing flange, said post and annular sealing flange defining an annular chamber therebetween, said annular chamber having a fluid input with at least one aperture therein adapted to communicate said annular chamber with the interior of the discharge nozzle and a fluid output communicating said annular chamber with said swirl chamber, said spinner being of integral, one-piece, molded plastic construction;*

*the swirl chamber is at the top of the post and is surrounded by an annular wall, said annular wall having at least one tangential groove therein communicating said swirl chamber with said annular chamber; and*

*a* cap adapted to fit over the spinner [assembly as defined by claim 46] and variably engage the discharge nozzle, said cap comprising a substantially annular side wall and a front face, said front face having an outer side, an inner side, and an orifice, said inner side comprising an annular central projection surrounding said orifice, said central projection having a height at least equal to the height of said annular wall at the top of said post of said spinner head and being configured and positioned to sealingly engage the inside of said annular wall when said cap is substantially completely engaged with said discharge nozzle.

53. The [cap] *trigger sprayer* as defined by claim 52, wherein said cap is threadably engageable with said discharge nozzle such that rotation of said cap about its axis in a first direction brings said cap into increasing engagement with said discharge nozzle and moves said central projection towards said swirl chamber and rotation of said cap about its axis in a second direction brings said cap into decreasing engagement with said discharge nozzle and moves said central projection away from said swirl chamber.

54. The [cap] *trigger sprayer* as defined by claim 52, wherein said cap is slidably engageable with said discharge nozzle such that sliding of said cap along its axis in a first direction brings said cap into increasing engagement with said discharge nozzle and moves said central projection towards said swirl chamber and sliding of said cap along its axis in a second direction brings said cap into decreasing engagement with said discharge nozzle and moves said central projection away from said swirl chamber.

55. The [cap] *trigger sprayer* as defined by claim 52, wherein said inner face further comprises an annular outer projection surrounding and spaced from said central projection, said central projection and said outer projection defining therebetween an annular groove having a width substantially identical to the width of said annular wall, whereby said annular wall is sealingly engaged between said central projection and said outer projection when said cap is substantially completely engaged with said discharge nozzle.

56. The [cap] *trigger sprayer* as defined by claim 55, wherein said outer projection has a height sufficient to extend at least to the bottom of said tangential groove when said cap is substantially completely engaged with said discharge nozzle.

57. The [cap] *trigger sprayer* as defined by claim 52, wherein the surface of said inner side is substantially smoother and, exclusive of said central projection, substantially flat.

58. The [cap] *trigger sprayer* as defined by claim 55, wherein the surface of said inner side is substantially smoother and, exclusive of said central projection and said outer projection, substantially flat.

59. [In a] *A* trigger sprayer for dispensing a liquid[, a spinner and discharge nozzle assembly] comprising:

a) a nozzle assembly;

b) a spinner [assembly] secured to said nozzle assembly [and having a spinner head at a downstream end thereof], said spinner [head] having an annular wall defining a swirl chamber therein, said annular wall having passage means therein communicating with said swirl chamber;

c) a cap adapted to fit over the spinner [head] and variably engage the [discharge] nozzle *assembly* between open and closed positions, said cap having a front face with an outer side, an inner side, and an orifice, said inner side having an annular central projection surrounding said orifice, and being configured and positioned to sealingly engage the inside of said annular wall of said spinner head when said central projection is within said annular wall.

60. The [spinner and discharge nozzle assembly] *trigger sprayer* as defined in claim 59 wherein said inner side of said cap has an annular groove surrounding said orifice for receiving the annular wall of said spinner head.

61. The [spinner and discharge nozzle assembly] *trigger sprayer* as defined in claim 60 wherein the width of said annular groove and the width of said annular wall are substantially equal to provide liquid sealing engagement both between the inner circumferential surface of said annular wall and the inner circumferential surface of said annular groove, and between the outer circumferential surface of said annular wall and the outer circumferential surface of said annular groove.

62. The [spinner and discharge nozzle assembly] *trigger sprayer* as defined in claim 61 wherein said passage means communicating with said swirl chamber comprises tangential grooves in said annular wall, and wherein the outer circumferential surface of said annular groove extends at least to the bottom of said tangential groove with said cap in its closed position.

63. The [spinner and discharge nozzle assembly] *trigger sprayer* as defined in claim 62 wherein said tangential grooves extend to substantially the full depth of the annular wall.

64. The [spinner and discharge nozzle assembly] *trigger sprayer* as defined in claim 62 wherein said central projection has a height of at least equal to the height of the annular wall of the spinner head.

* * * * *